US011054265B2

(12) United States Patent
Geissler et al.

(10) Patent No.: US 11,054,265 B2
(45) Date of Patent: Jul. 6, 2021

(54) METHODS AND SYSTEMS FOR IMPROVING MAPS

(71) Applicant: Intel Corporation, Santa Clara, CA (US)

(72) Inventors: Florian Geissler, Munich (DE); Ralf Graefe, Haar (DE); Michael Paulitsch, Ottobrunn (DE); Rainer Makowitz, Munich (DE)

(73) Assignee: Intel Corporation, Santa Clara, CA (US)

( * ) Notice: Subject to any disclaimer, the term of this patent is extended or adjusted under 35 U.S.C. 154(b) by 201 days.

(21) Appl. No.: 16/369,029

(22) Filed: Mar. 29, 2019

(65) Prior Publication Data

US 2019/0226854 A1 Jul. 25, 2019

(51) Int. Cl.
*G01C 21/32* (2006.01)
*G06K 9/00* (2006.01)
*G06T 7/70* (2017.01)

(52) U.S. Cl.
CPC ......... *G01C 21/32* (2013.01); *G06K 9/00825* (2013.01); *G06T 7/70* (2017.01); *G06T 2207/30252* (2013.01)

(58) Field of Classification Search
CPC .............. G01C 21/32; G06K 9/00825; G06K 9/00664; G06T 7/70; G06T 2207/30252
See application file for complete search history.

(56) References Cited

U.S. PATENT DOCUMENTS

2017/0213463 A1* 7/2017 Mizes ................. G06T 7/254
2019/0163990 A1* 5/2019 Mei ....................... G01C 21/32

OTHER PUBLICATIONS

Chavez-Garcia, R. O.; "Multiple Sensor Fusion for Detection, Classification and Tracking of Moving Objects in Driving Environments"; Nov. 12, 2014; 177 pages; University of Grenoble, France.
Reineking, T.; "Particle filtering in the Dempster-Shafer theory"; International Journal of Approximate Reasoning; Jun. 30, 2011; pp. 1124-1135, vol. 52, Elsevier Inc.
Elfes, A.; "Using Occupancy Grids for Mobile Robot Perception and Navigation"; Computer; Jun. 1989; pp. 46-57; vol. 22, Issue 6, IEEE.
"Intelligent Transport Systems (ITS); Vehicular Communications; Basic Set of Applications; Local Dynamic Map (LDM); Rationale for and guidance on standardization"; ETSI TR 102 863 Technical Report; Jun. 2011; pp. 1-40; ETSI, Sophia Antipolis, France.
Lee, Y. W. et al.; "AIMQ: A methodology for information quality assessment"; Information and Management; Dec. 2002; pp. 133-146, vol. 40, Elsevier.

(Continued)

*Primary Examiner* — Rodney A Butler
(74) *Attorney, Agent, or Firm* — Viering, Jentschura & Partner MBB

(57) ABSTRACT

Methods, systems, and apparatus, including computer programs encoded on non-transitory computer storage medium(s), are directed to improving completeness of map information and data related to maps created through sensor data. Map completeness can be improved by determining object completeness and coverage completeness of a generated map and reducing amount of unknown areas of the generated map.

19 Claims, 8 Drawing Sheets

(56) References Cited

OTHER PUBLICATIONS

"Handbook of Multisensor Data Fusion: Theory and Practice"; 2009; 13 pages (table of contents); CRC Press; Boca Raton, FL; https://doi.org/10.1201/9781420053098 (accessed May 2, 2019).

Moras, J. et al.; "Credibilist occupancy grids for vehicle perception in dynamic environments"; IEEE International Conference on Robotics and Automation; May 2011; pp. 84-89; Shanghai, China.

Obst, M. et al.; "Multi-sensor data fusion for checking plausibility of V2V communications by vision-based multiple-object tracking"; IEEE Vehicular Networking Conference (VNC); Dec. 2014; pp. 143-150; Paderborn, Germany.

Paden, B. et al.; "A Survey of Motion Planning and Control Techniques for Self-Driving Urban Vehicles"; IEEE Transactions on Intelligent Vehicles; Mar. 2016; pp. 33-55, vol. 1, No. 1.

Shalev-Shwartz, S. et al.; "On a Formal Model of Safe and Scalable Self-driving Cars"; Mobileye; 2017; pp. 1-37.

\* cited by examiner

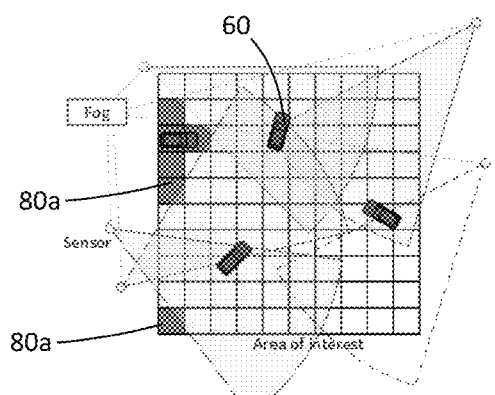# 
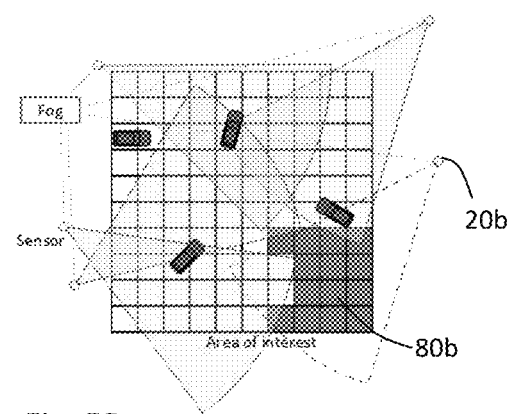
Fig. 5A $S_{design}$    Fig. 5B $S_{failed}$
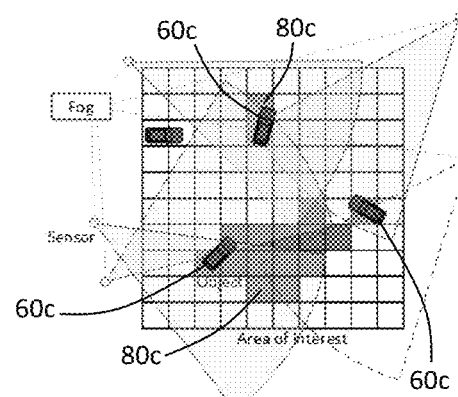
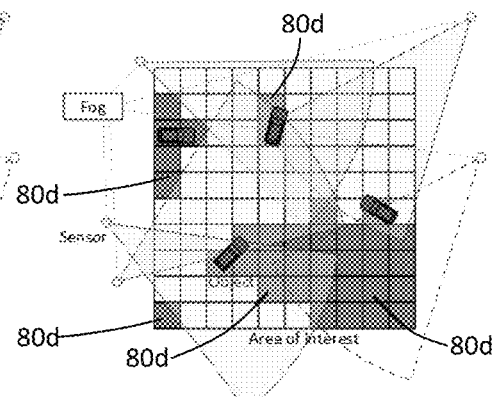
Fig. 5C $S_{occluded}$    Fig. 5D $S_{unknown}$

METHODS AND SYSTEMS FOR IMPROVING MAPS

TECHNICAL FIELD

Various embodiments generally relate to improving maps.

BACKGROUND

Automated agents such as robots or cars rely on dynamic maps to navigate in a changing environment. Those maps are created from in-vehicle or remote (e.g., infrastructure) sensor detections and need to meet certain quality requirements in order to generate safe motion trajectories. While state-of-the-art multi-sensor fusion schemes entail a variety of ad hoc plausibility checks to verify the correctness and accuracy of performed sensor measurements, little attention is paid to the consequences of the lack of information about specific objects or areas, i.e., the quality attribute of completeness. No-coverage regions represent generic safety risks, as they may contain hidden moving objects, and should, therefore, be avoided. Especially in the case of remote infrastructure sensing, this is expected to be of high relevance since undetectable areas may be located in the immediate driving path of a vehicle. The problem remains, however, that an automated agent is typically not aware of the incompleteness of the map it uses, but only of the objects that were actually detected, except if a reference ground truth is available (i.e., an alternative source of information for the same environment). As a consequence, it cannot always make appropriate decisions.

In general, to the extent there are previous solutions, there is no concept for the systematical quantification of ignorance of the map information. Ignorance about individual sensor measurements is used for the purpose of data fusion, but no meaningful completeness measure related to the map information is reported to the end user. As a consequence, previous completeness metrics are not considered for decision-making of users. This is a safety-critical issue especially for complex automation environments such as a roadside sensor infrastructure.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIGS. 5A-5D show further exemplary sensor fields in accordance with or implemented in exemplary embodiments of the present disclosure.

DESCRIPTION

Figure 1:
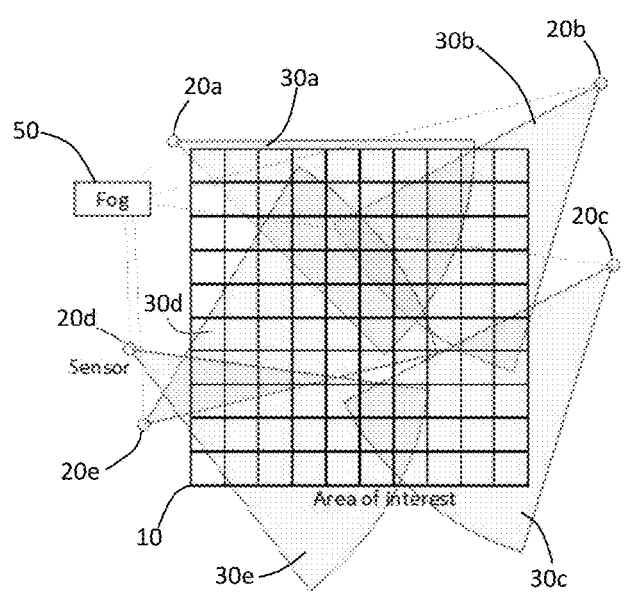
FIGS. 1 and 2 show exemplary collaborative sensor fields in accordance with or implemented in exemplary embodiments of the present disclosure.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description and claims refer to a quantity greater than one. The terms "group," "set," "sequence," and the like refer to a quantity equal to or greater than one. Any term expressed in plural form that does not expressly state "plurality" or "multiple" similarly refers to a quantity equal to or greater than one. The term "lesser subset" refers to a subset of a set that contains less than all elements of the set. Any vector and/or matrix notation utilized herein is exemplary in nature and is employed for purposes of explanation. Aspects of this disclosure described with vector and/or matrix notation are not limited to being implemented with vectors and/or matrices, and the associated processes and computations may be performed in an equivalent manner with sets or sequences of data or other information.

As used herein, the terms "a" or "an" shall mean one or more than one. The term "another" is defined as a second or more. The terms "including" and/or "having" are open-ended (e.g., comprising). The term "and/or" as used herein is interpreted such that "A and/or B" means any of the following: A alone; B alone; A and B. Similarly, A, B, and/or C means any of the following: A; B; A and B; A and C; B and C; A and B and C.

As used herein, "memory" is understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction(s), including firmware, for example.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations.

Various exemplary embodiments of the present disclosure relate to systems, apparatuses, and/or methods related or directed to estimation (e.g., real-time estimation) of the completeness of a map (e.g., dynamically created map) or a selected sub-region of the map, particularly in the absence of an external ground truth. In various exemplary embodiments, the specifics of the sensor field design such as, but not limited to, positions, range, orientations, etc. are known. That is various exemplary embodiments herein relate to methods to estimate the completeness of information for dynamic occupancy grid maps in the absence of ground truth.

In one or more embodiments of the present disclosure, regions with supervised borders, for example, confined road sections, may allow for an enhancement of the map completeness by object counting, and thus improvement of the quality of information of the dynamic map.

Figure 2:
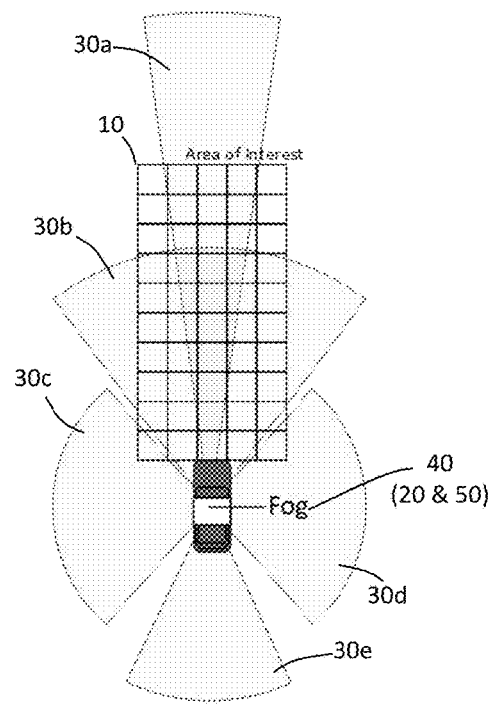

FIGS. 1 and 2 show, according to exemplary embodiments of the present disclosure, examples of collaborative sensor fields. In FIG. 1, an area of interest (AoI) 10 is covered by the field of views (FoVs) of the spatially distributed sensors 20a, 20b, 20c, 20d, and 20e. In FIG. 1, the FoVs 30a, 30b, 30c, 30d, and 30e do not wholly cover the AoI. Each sensor sends or transmits its sensor data to a central computation node 50. In some embodiment, the central computation node is known as a fog node, or simply the fog. Further, each sensor may be characterized by its FoV, range, resolution, orientation, sensor location, and can have a unique sensor index. In various embodiments, this or related sensor information may be known to the fog 50 at any instant of time (so if necessary it is dynamically updated).

In general, sensors described herein may transmit sensor data to a computation node (e.g., central computation node) or fog through any suitable means, e.g., directly or indirectly through wired or wirelessly means. A central computation node may be any suitable computing device or devices. Further, in accordance with various embodiments of the present disclosure, sensor detection information (e.g., target position, target velocity, size, etc.) may be reported or electronically conveyed (e.g., wired or wireless) from a sensor to the central node. This sensor information may be repeatedly and/or continuously transmitted to the fog over time.

In general, the sensors described herein may be radar sensors, camera devices, light, LIDAR sensors, and/or any other suitable sensors (e.g., a sonar sensor, a LIDAR sensor, radar sensor, a video/camera image sensor, or a V2X sensor). For example, one sensor on a vehicle (e.g., a motor vehicle) may be a mounted rotating LIDAR sensor.

In various situations, for the sake of simplicity, it may be assumed that the probability of a false positive or a false negative detection is negligible if a sensor has a direct line of sight to the target. A target is missed by the sensor field if it is occluded by other objects, or not in the sensor's FoV. Further, in some exemplary embodiments, false positive measurements can be eliminated to a significant extent by using tracking algorithms. For example, the chance for a false negative detection of an object in direct sight of a sensor can depend on the technical capabilities of the sensor but is usually small. In various embodiments, sensors are used that have the capability to detect or read the size of a detected object.

A computing node (e.g., central computing node) or fog 50 may include or be one or more computing devices which, among other things may be configured to dynamically generate a map using sensor data obtained from sensors. More specifically, the central node or fog may implement a fusion mapping algorithm to dynamically generate a map from obtained sensor data. That is, the fog hosts computational processes to fuse individual sensor data in order to create a dynamic map. The map may be dynamically created or updated in real-time. In various embodiments, occupancy grid maps (OGM) may be built from uniformly spaced cells as a discretized environment model.

In addition to dynamically creating a map with received sensor data, the fog may be further configured to monitor the health of sensors, e.g., via a heartbeat update signal, and be configured to immediate detect or realize sensor outages.

In further exemplary embodiments, the map information (e.g., the generated map) may be transmitted (e.g., via wired or wireless technology) to an agent for the purpose of collaborative awareness and navigation. The agent may be a process or algorithm implemented by the fog or another computing device.

In one example, a vehicle may use the map input in order to deduce a driving decision. That is, agents may have to be able to associate their "ego perspective" with the map content for self-localization, i.e., they share a reference coordinate system with the sensor field. This is, for instance, the case if both the agents and the sensor field possess a module for GNSS positioning (global navigation satellite system).

In various embodiments of the present disclosure, an area of interest (AoI) is a well-defined area (or areas in certain circumstances) in space. An AoI may be determined by a user (e.g., user defined by user input) and/or may encompass a relevant region for a task at hand. An AoI may, but does not necessarily, overlap with the area surveilled by a collaborative sensor field. For instance, the AoI may be a sub-region of a map that is of particular interest for an imminent driving operation. If the AoI has only a small or no overlap with the extent of the dynamic map, this presents substantial design incompleteness.

Referring back to FIG. 1, shows the AoI 10 which is surveilled by the sensors by sensors 20a, 20b, 20c, 20d, and 20e. The sensors 20 (sensors 20a, 20b, 20c, 20d, and 20e) of FIG. 1 may be implemented as part of a roadside sensor infrastructure that is used to support automated roads. However, the FOVs 30a-30e do not entirely overlap with or cover the AOI 10.

In the example of FIG. 2, the sensors and fog are included or integrated with vehicle 40. That is, the vehicle 40 has onboard sensors for environment perception. In the case of FIG. 2, the AoI is not fixed or confined. In FIG. 2, the sensors have FoVs 30a, 30b, 30c, 30d, and 30e which are fixed relative to the vehicle 40. The AoI in this example is an area in front of the vehicle 40.

Figure 3:
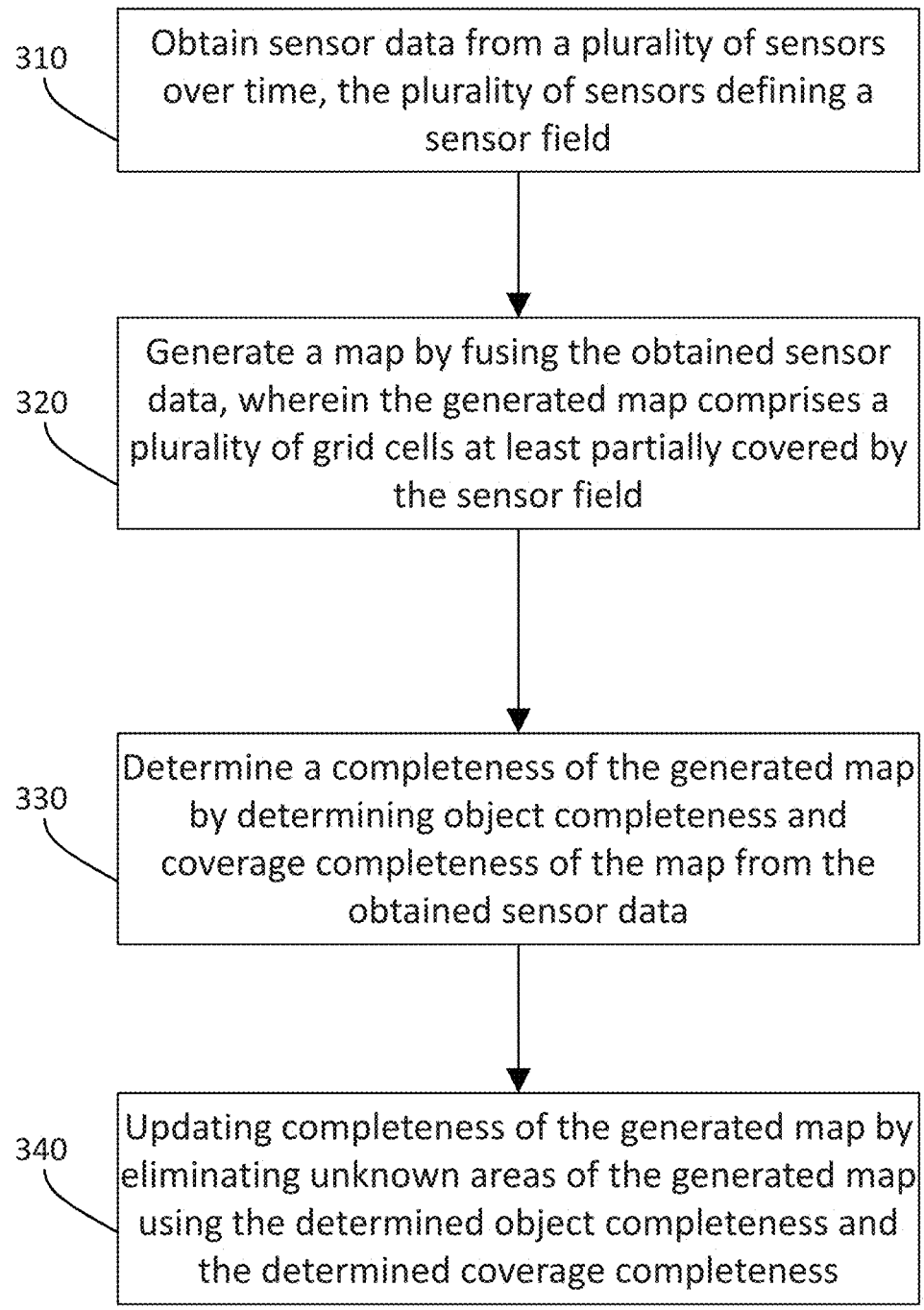
FIG. 3 shows an exemplary method for improving completeness of a map in accordance with or implemented in exemplary embodiments of the present disclosure.
Figure 4:
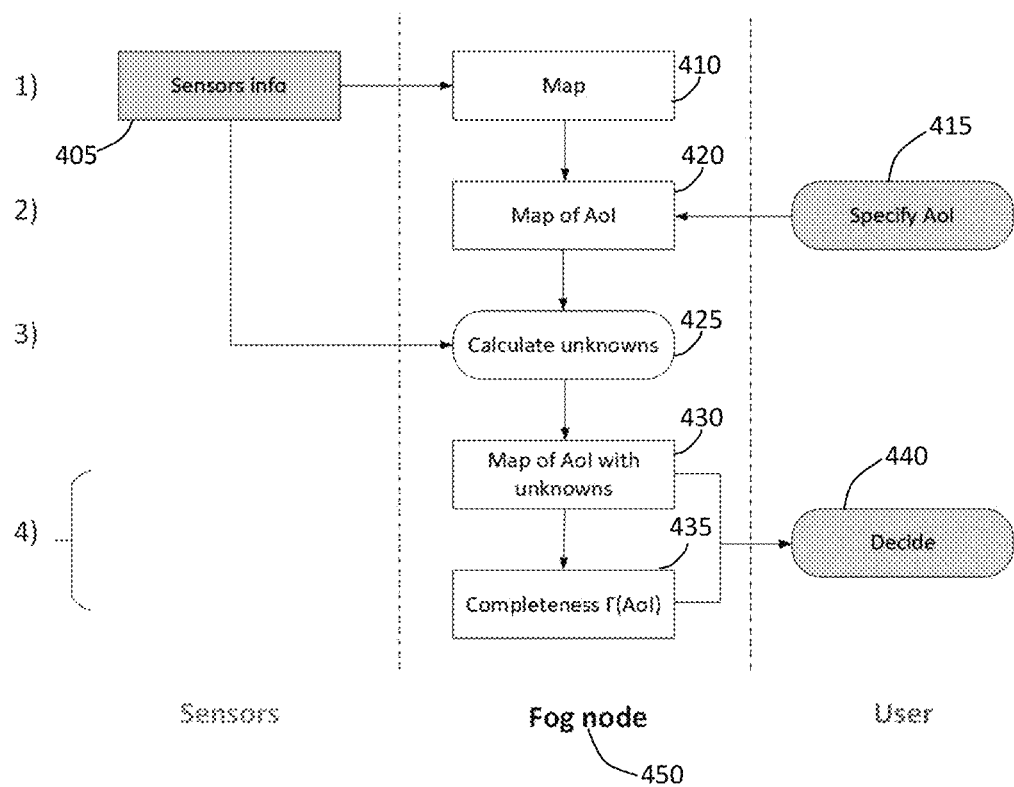
FIG. 4 shows an exemplary process flow in accordance with or implemented in exemplary embodiments of the present disclosure.

FIG. 3, shows according to at least one exemplary embodiment of the present disclosure, an exemplary method for improving the completeness of a dynamically created map. FIG. 3 may be understood in conjunction with the exemplary embodiment depicted in FIG. 4. That is FIG. 4 shows, according to at least one exemplary embodiment, a process flow related to the method of FIG. 3. The method depicted in FIG. 3 may be implemented by one or processors of one or more computing devices. The one or more computing devices may be a central node or fog.

At 310 of FIG. 3, one or more computing devices obtain sensor data or sensor information from a plurality of sensors over time, wherein the plurality of sensors define a sensor field. For example, the sensors may be spatially distributed as shown in FIGS. 1 and 2.

At 320 of FIG. 3, the one or more computing devices dynamically generate a map by fusing the obtained sensor data, wherein the generated map includes a plurality of grid cells at least partially covered by the sensor field. That is, the generated map may be or may include information representing or regarding the external environment covered by the sensors, e.g., each grid cell may include or may be associated with external or environmental information. The grid cells or simply cells may be any suitable shape or size and may depend on the characteristics of the sensors. That is, the grid cells are not necessarily uniform in shape or size. Any suitable sensor fusion algorithm may be used to create a sensor map or mapping from the sensor data, including but not limited algorithms/techniques involving or applying Central limit theorem, Kalman filter, Bayesian networks, Dempster-Shafer, Convolutional neural network, etc.

Further in one or more embodiments, the exemplary method of FIG. 3 may further include receiving an AoI, e.g., from a user. Accordingly, the generated map may include or be limited to the AoI, which may be a subregion of a subsection of the map. FIG. 4, shows the flow of sensor data or sensor info 405 into the fog 450 in order to generate a map at 410. FIG. 4 shows at 415 input may be received, e.g., from a user or an electronic source, which specifies an AoI 415. The AoI is transmitted or obtained by the fog 415 and used to update or refine the map 410 to an AoI map 420.

Referring back to FIG. 3, at 330, the one or more computing devices determine completeness of the generated map by determining object completeness and coverage completeness of the generated map from the obtained sensor data. In one or more embodiments, the one or more computing devices may determine the completeness of a subsection or subregion of the generated map, e.g., the AoI. FIG. 4 shows the sensor info 405 used by the fog 450 to determine the map completeness by calculating unknowns at 425. The completeness determination, as explained, in more detail below, may include determining unknown areas of the map. For example, the unknown areas may be areas (e.g., cells) wherein the occupancy status is unknown or not ascertainable by lack of sufficient sensor information for that area.

At 340 of FIG. 3, the one or more computing devices may update (or improve) completeness of the generated map by eliminating unknown areas of the generated map using the determined object completeness and the determined coverage completeness. In other words, the map or the map information may be updated to reduce the amount of or number of unknown areas. That is, one or more unknown areas of the map may now be considered as "known". For example, the one or more computing devices can use the completeness information to eliminate or reduce the amount of or number of unknown areas in an obtained AoI, rather than reduce unknown areas in the entire map.

For example, FIG. 4 shows the map of AOI with unknowns being updated at 430 and the completeness information is also determined or calculated at 435. This updated information may be further used. For example, the information associated with determining completeness may include calculation of completeness metrics (e.g., Γ(AoI). Thus the updated map (with reduced unknown areas) and/or the completeness metrics may be transmitted or used as input in a further decision process at 440. In one example, the updated AOI map and the completeness metrics may be inputted into a self-driving algorithm or any other computer process which uses the data. In some embodiments, the information is simply given or presented (e.g., visually) to the user, e.g., through a display device so as to be relied on by the user.

Figure 6:
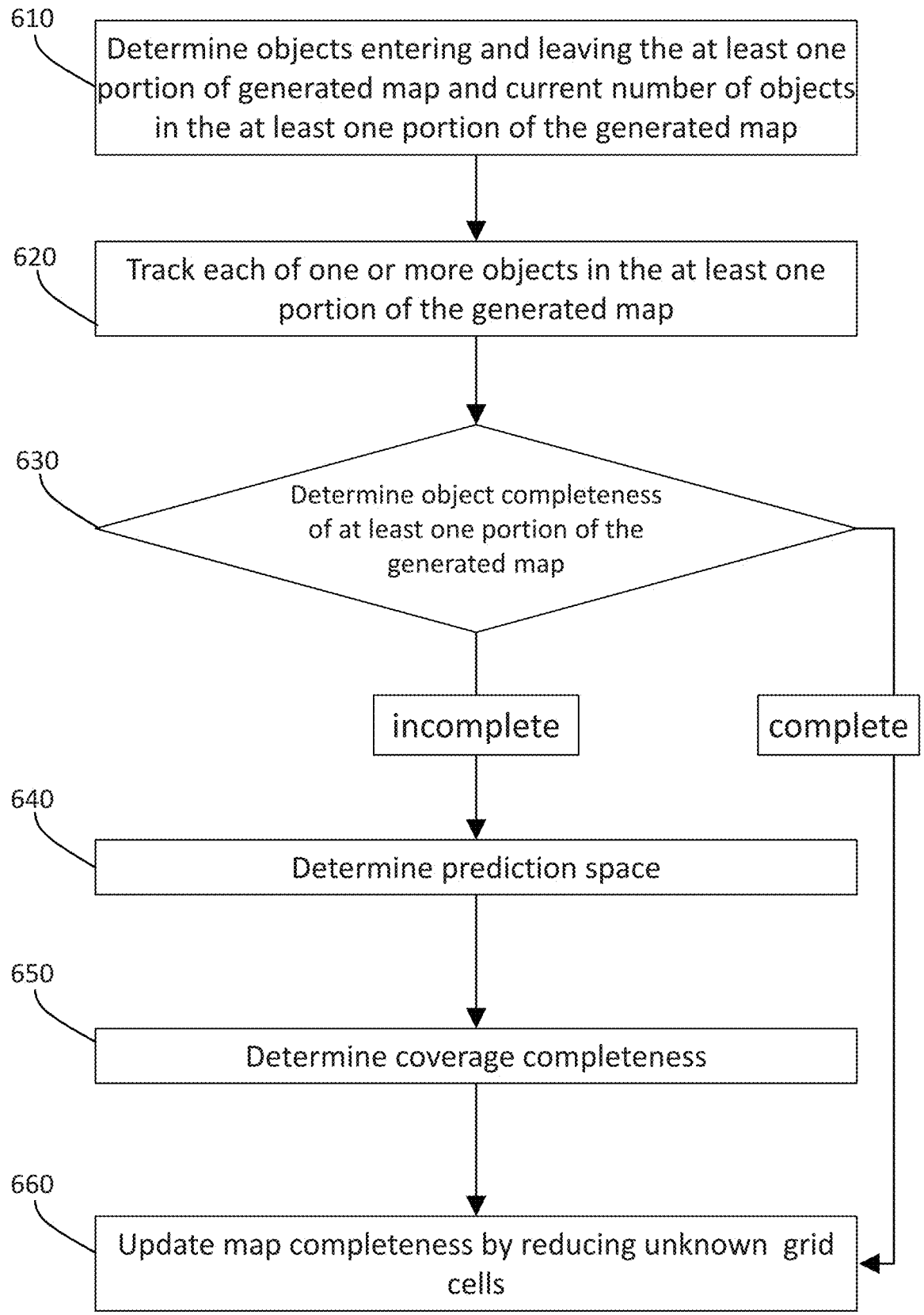
FIG. 6 shows an exemplary process for determining and improving map completeness in accordance with or implemented in exemplary embodiments of the present disclosure.

In general, map completeness reflects the degree to which the map or sensor is sufficient to represent the universe of discourse (e.g., AoI). Map completeness is generally reduced or lowered by the failure of capturing a portion of information of the ground truth, e.g., by a sensor missing an object (e.g., a passing object). Referring back to FIG. 3, at 330, two types of completeness are determined or calculated, namely, object completeness and coverage completeness. FIG. 6, shows according to at least one exemplary embodiment, a process for determining and improving map completeness by determining object and coverage completeness.

In general, in an object-based environment representation model, object completeness can be measured as the ratio of objects (including attributes such as size, position, and velocity) reported in a map (e.g., AoI map) and objects according to the ground truth. That is, the objects that are known are compared to the objects that are currently present. However, an incomplete object number does not yield information about the location of the missing objects. Furthermore, the respective ground truth is typically not available in a realistic dynamic environment.

In a grid-based environment model, on the other hand, the unit of information is not an object entity but instead a grid cell (a Euclidean area) with a known or unknown status. In this case, coverage completeness may be determined or calculated by comparing the numbers of grid cells that are known with the number of the grid cells that are currently present. This is equivalent to the ratio of the spatially covered part of the AoI and the full extent of the AoI.

Coverage and object completeness may be represented, in general, by different metrics and will coincide only in the case of perfectly homogeneous traffic, and minimal cell occlusions. This can be understood as follows: For the ideal case of an ideally homogeneous vehicle distribution having a constant density of vehicles per area, in both the covered and uncovered sections of the AoI, the coverage completeness and object completeness measures will, on average, even out or coincide to each other. However, a passing object may cast a shadow on grid cells behind an area that—depending on the sensor field design—might be quite different from the area corresponding to the occluded vehicles in this shadowed region. Therefore, both measures can differ in practice.

As discussed in FIG. 3, completeness of a generated map is improved by eliminating unknown areas using both the determined object completeness and the determined coverage completeness.

In various embodiments of the present application, object completeness may include determining whether any objects are missing from a map, e.g., a AoI. The map, as, described in various embodiments, may be generated through sensor fusion e.g., an implementation of a sensor fusion algorithm that operates on obtained sensor data. Sensor fusion algorithms generally includes methods, techniques, or processes combining of data from several sensors or sources for the purpose of improving application or system performance. (See e.g., https://en.wikipedia.org/wiki/Sensor_fusion). In various exemplary embodiments, sensor data may be of environmental nature from various sources that is intelligently or merged or combined for localization and mapping of outdoor or external environments.

For example, FIG. 6 at 610, one or more computing devices (e.g., a fog) is configured to determine objects entering and leaving at least one portion of the generated map and determine a current number of objects in the at least one portion of the generated map. This may be accomplished by monitoring of object flow in and out of the map area (AoI). In other words, the entry and exit areas of the map or AoI may be supervised so that objects cannot enter or exit unnoticed. Sensors, which may be in addition to and independent of the sensors used to generate a fusion map, may be deployed for monitoring or supervising the ingress and egress of objects. Such additional sensors, for example, may include cameras, light barriers, or devices implementing wireless handshake messages at the entry and exit points.

In short, the fog may receive the sensor information to dynamically or continuously track and concurrently count the number of objects leaving and entering as well as the number of objects currently in the AoI. The count of objects may be done or implemented at any instant of time to establish a dynamic ground truth with respect to the number of objects. As a prerequisite, the ground truth may need to be calibrated once, e.g., by a blank or empty scene.

Furthermore, determining object completeness may include separately or independently monitoring or tracking each of the objects in the map or AoI. At 620 of FIG. 6 the fog tracks or monitors each of one or more objects in the at least one portion of the generated map. The tracking of the objects may be done by the collaboration of sensors making or defining the sensor field. In this case, these sensors can detect the presence of objects and then be used to track the movement of objects. Also, the sensors can be used to detect and record various attributes of the objects in the sensor field including, for example, target position, target velocity, size, orientation, etc. This sensor information is reported or transmitted to the fog which uses the information to track each object. In various embodiments of the present disclosure, this sensor data is associated with each object, e.g., the detection (e.g., where, when, etc., an object is detected) as well as the object attributes (size, position, velocity, orientation, etc.) can be stored in any suitable computer storage medium, e.g., one or more database operatively connected to the fog. Furthermore, the statuses of the sensors (sensor operating status, sensor location, sensor FoV, etc.) may also be stored. Upon detection of an object, the fog may uniquely assign an identification to the tracked object (which can be stored with the associated attributes of the tracked objects). In short, the fog may at any time retrieve rely on such information, e.g., the historical data sensor data.

In FIG. 6, at 630, the fog may determine object completeness of at least one portion of the generated map. That is, based on the verifying of the determined current quantity of objects (in the AoI) and the number of objects that have left or entered the AoI with the tracking, the one or more computing devices can determine the extent of object completeness. For example, there will be object completeness when the object tracking does not detect the disappearance of any objects and the tracking corresponds with the amount or quantity of current objects factoring in the number of objects that have entered or left. That is, based on the current quantity and amount objects entering and leaving, the tracking information can indicate whether any objects are missing. If there are no objects missing, for example, if none of the tracked objects goes "missing" and the net change of objects in the AoI is accounted for by the objects that entered or left, then the map can be determined to be complete. That is, a map determined to be complete means no object is unaccounted for and thus there are no unknown grid cells with respect to occupancy in at least the AoI of the map. Then the map can be updated at step 660.

In the case where there are no missing objects—then there would be considered no unknown areas—e.g., no areas where the occupancy of the areas (grid cell) is unknown.

However, in the case where a map is incomplete, e.g., one or more objects are missing or unaccounted for, then at 640, a prediction space is determined. For example, when one or more objects are determined to be missing, e.g., based on analyzing the tracking and count information (current quantity information and number of objects the entering and exiting), then the fog determines or calculates the prediction space for each missing object. The prediction space of all missing objects is the unified prediction space.

In accordance with exemplary embodiments of present disclosure, various events associated with an object may be detected using the sensors. For example, the fog may use obtained sensor data to detect or identify a disappearance event as discussed. Disappearance of an object may be ascertained by comparing the detection history in the preceding time step(s) to the detection(s) in the current time step so that the absence of a steady continuation of the vehicle path can be verified. Thus, the fog can infer that the object, e.g., a vehicle has either left the FoV of the sensor field or is occluded.

In various embodiments, the fog uses obtained sensor data to determine an exit event. An exit event may be equivalent to a disappearance event except for the fact that that the vehicle has left the map (AoI) in the specified time interval. The fog may be configured to determine or identify an entry event. An entry event may be equivalent or similar to an exit event except for the fact that the vehicle has entered the AoI in the specified time interval. The fog may be configured to determine or ascertain an appearance event. An appearance of an object may be ascertained or discovered by comparing the detection history in a preceding time step(s) to detection(s) in the current time step. Vehicle detections occur for vehicles that have no continuous track history. The fog can infer or determine that an object has now or just entered a sensor FoV after it was occluded, or out of the FoV a time step ago.

Upon realizing an appearance event, the fog can cancel the prediction space associated with the reappeared object in order to free the involved grid space. Further, the fog can reassign the object ID to specify which of the previously occluded objects has reappeared. As more than one object can be located within the prediction space, the reassignment might not always be unique, in which case a portion of the prediction space should be kept. Reassignment is facilitated if, together with the ID, the object type is also registered and stored.

In various exemplary embodiments of the present disclosure, object status is managed to adapt to the above events. Below is exemplary pseudocode that illustrates such logic. Two lists are maintained featuring all objects in the AoI, at subsequent time steps (previous and current):

```
list_prev={v_1,v_2, ...};
list_curr={v_1, v_2, ...};
Each vehicle object is a structure with at least the following properties
    v=struct(ID, position, velocity, size, status, prediction space);
    status ∈ {vis, invis, noAoI};
The status can be either of visible (vis), invisible (invis) or not in the AoI
(noAoI).
    Initialize list_prev, list_curr;
    WHILE time<time limit
        FOR all detections
            Write list_curr.position, list_curr.velocity, list_curr.size,
            list_curr.status=vis or noAoI;
        ENDFOR
        Assign list_curr IDs by matching positions, velocities of list_curr to
        list_prev;
        Complement list_curr with items present in list_prev but not in
        list_curr (so list_curr.status=invis);
        Identify exit/entry/appearance/disappearance + continuing invisibility
        events from list_curr and list_prev status;
            FOR all events
                IF disappearance or continuing invisibility
                    Update prediction space using last known position
                    and velocity in list_prev;
                ELSEIF appearance event
                    Reassign ID and reset respective prediction space;
                ELSEIF exit event
                    Delete from list_curr;
                ENDIF
            ENDFOR
        time=time+1;
        list_prev=list_curr;
    ENDWHILE
```

Regarding coverage completeness, a map (e.g., a map generated through a fusion algorithm based on collaborative sensor data as described herein) may include a plurality of grid cells. Referring again to FIG. 6, at 650 coverage completeness is determined by computing devices/fog through calculating or determining unknown grid cells of the generated map or the AoI of the generated map. In other words, to determine coverage completeness, the state of each grid cell is evaluated. In at least one embodiment of the present disclosure, the computing devices determine whether or not there is sufficient sensor information for each grid cell to determine whether the particular cell is occupied or not. Moreover, the sensor information is evaluated whether the sensor information is adequate to establish whether or not the occupancy state of the grid cell is known. For example, if there is no sensor information or the sensor information is inadequate for a particular grid cell, then that particular grid cell is determined to be and/or assigned an "unknown" state. For example, the state of "unknown" can be invoked or determined if no sensor information for the grid cell is available because the cell is not covered by the sensor field.

By contrast, if the sensor information of that grid cell is sufficient to establish the occupancy state, then the grid cell is determined and/or assigned a "known" state. Further, in the case of the grid cell state being known, the grid cell can be further determined and/or assigned as having an "occupied" or "unoccupied" state. That is, if the sensor data indicates there is at least one object in the grid cell, then the grid cell can be determined or assigned an occupied state. Similarly, if the sensor data indicates there is no object in the grid cell, then the grid cell can be determined or assigned an "unoccupied" state. In accordance with exemplary embodiments, the object can be almost anything that occupies a grid cell. In some embodiments where the generated fusion map or AoI includes a road, the object(s) may be a motor vehicle, bicycle, pedestrian, animal, rock, etc.

In the present disclosure, the unified set of all grid cells with the label unknown may be denoted $S_{unknown}$. The "unknownness" of a grid cell may be attributed to different sources such as design completeness, systematic completeness, and sensing-related completeness.

Unknown grid cells due to design completeness, denoted $S_{design}$, occur when a portion of the map (e.g., AoI) is not covered by the sensor field due to design constraints. Unknown grid cells due to systematic completeness, denoted $S_{failed}$, occurs when a portion of the map (AoI) is currently not covered by the sensor field due to the failure of one or more sensors, but would otherwise be covered if the sensor field was fully functional. Unknown grid cells due to sensing-related completeness, denoted $S_{occluded}$, occurs when a portion of the map (AoI) that is currently not covered by the sensor field even though the system is working properly or correctly. For example, this may be caused by an object occluding or blocking of sensing of grid cells.

In accordance with various exemplary embodiments of the present disclosure, the parameters $S_{design}$, $Sf_{ailed}$, $S_{occluded}$, and $S_{unknown}$ may be depicted in FIGS. 5A-5D. As shown, FIGS. 5A-5D include the sensors, sensor field, AoI, etc. depicted in FIG. 2. Further included in these figures is a plurality of objects 60, which in this example are vehicles within the AoI.

The one or more grid cells belonging to the set $S_{design}$ can be determined or ascertained directly by comparing the known sensor FoVs and orientations to the map or AoI. $S_{design}$ can change due to shifts of the area of interest, or by a reconfiguration of the sensor field. In the example of FIG. 5A, the cells 80a are cells that are unknown due to design constraints and thus belong to $S_{design}$. As shown, the cells 80a are not covered by the sensors, e.g., outside the FoV of the sensors, but are cells in the AoI.

The one or more grid cells belonging to the set $S_{failed}$ can be determined or derived by locating a failed sensor in the sensor field by its unique ID, and analyzing the change in coverage of the map or AoI. This can be readily achieved in the case that the configuration of each sensor is known to the fog node. $S_{failed}$ can vary on the typically very large timescale of the order of the mean lifetime of a sensor, or if the map or AoI is modified. In the example of FIG. 5B, the cells 80b are cells that are unknown due to sensor failure and thus belonging to $S_{design}$. As shown, the cells 80b are within the field of view of failed sensor 20b. In other words, these cells are in the AoI but and within the designed sensor filed but are unknown due to sensor failure.

The one or more grid cells belonging to $S_{occluded}$ can be ascertained or determined based on object detections made by the sensor field. For example, the fog node can project the subdomains of the map or AoI that are shadowed behind detected objects while taking into account measurement uncertainties. This set changes continuously, following the object motion. Sensing-related completeness may be particularly important for a roadside sensor infrastructure, as the sensing perspective might be quite different from the perspective of a vehicle on the road, and occluded areas can therefore occur in immediate proximity of moving objects. In the example of FIG. 5C, the cells 80c are cells that are unknown due to occlusion or blocking sensor failure and thus belonging to $S_{design}$. As shown, the cells 80c are within the field of view of the some of the sensors but are blocked by the objects (vehicles) 60c.

Finally, FIG. 5D shows the total of unknown cells due to design constraints ($S_{design}$), sensor failure ($S_{failed}$), and occlusion ($S_{occluded}$). Accordingly, the total set of unknown cells then is the union, based on coverage completeness approach is:

$$S_{unknown} = S_{design} \cup S_{failed} \cup S_{occluded}$$

Therefore, the overall coverage completeness Γ of the map or AoI without further modification is:

$$\Gamma = \frac{|S_{unknown}|}{|S|}$$

where S is the set of all grid cells including the entire area of interest. F usually refers to a chosen AoI of a map.

For an arbitrary traffic scenario and any AoI, the coverage completeness defined above can serve as a quality measure for the usability of the dynamic map. A general estimate of this kind will lead to upper-bound incompleteness values, and thus to overly cautious decisions, since all occluded areas are treated as zones of safety risks. Further, coverage completeness is determinable even in the absence of an object number ground truth, and may therefore be especially useful in very dynamic environments of low predictability, such as a densely populated urban setup.

In accordance with various embodiments the fog or central computing node can be configured to determine the total set of unknown cells and/or the total completeness. The fog may determine this information dynamically, e.g., the information is determined or calculated as the obtained sensor information is received or updated.

In accordance with exemplary embodiments of the present disclosure, if a fog node realizes a disappearance event, it may be triggered to calculate an individual prediction space for the respective object (e.g., vehicle). For example, a prediction scheme may be implemented by the fog so as to estimate the set of all grid cells that can be physically occupied. Accordingly, a disappearance event is realized, e.g., from the fog using the senor data, then the fog may resort to and use the immediate object history in order to determine or estimate the object horizon, e.g., the possible positions (grid cells) the object can occupy. In various embodiments, determination of the prediction space may rely on using a mechanical motion model of the disappeared object based on one or more last known positions and velocities. Any suitable algorithm or process may be used to estimate the object horizons. For example, in the case that the objects are vehicles, a maximal steering angle and physical acceleration rate may be used by the fog to determine the vehicle horizons.

The set of grid cells within the union of all such object horizons may denoted the unified prediction space $S_{physical}$. In other word, $S_{physical}$ includes the possible positions of missing objects, e.g., includes the one or more grid cells that which can be occupied by one or more missing objects.

Back in FIG. 6, at 660 the computing devices or fog update the map completeness by reducing the amount of unknown grid cell. For example, in accordance with exemplary embodiments, after the object completeness determined, (e.g., $S_{physical}$ is determined) then coverage completeness can then be calculated and improved. Updating map completeness can be implemented by eliminating as "unknown" grid or re-identifying or reassigning certain identified unknown grid cells to "known". In particular, the unknown grid cells (e.g., $S_{unknown}$) that are NOT members of the unified prediction space (e.g., $S_{physical}$) can be eliminated. These are cells are the ones that would not be occupied. Thus, the new or updated cells are those cells belonging to the prediction space that also overlap with the originally determined or calculated unknown cells.

In the case where all objects are accounted for (full object completeness) it is therefore realized by the computing devices that these original unknown cells are not be occupied by any objects. By contrast, in the case where there is a disappearance event—grid cells that were originally unknown can be eliminated as unknown because the prediction space indicates that the "missing objects" are or would not be in these grid cells.

In exemplary embodiments, the fog can use the unified prediction space to eliminate unknown grid cells from the previous set of unknown grid cells. This refinement by the fog may be expressed as follows:

$$S_{unknown}' = S_{unknown} \cap S_{physical}$$

$$S_{unknown}' = S_{design} \cup S_{failed} \cup S_{occluded} \cap S_{physical}$$

In short, the $S_{unknown}'$ is the intersection of the previous $S_{unknown}$ and $S_{physical}$.

Depending on the system design, this refinement can significantly improve the completeness quality measure, as is demonstrated in the next section. The corner case of a complete object detection is important: If the presence of all objects is verified—there are no disappearance events and thus there are no missing objects—then all unknown grid cells can safely be considered as unoccupied, leading to a temporarily complete dynamic map.

The elimination of unknown grid domains is possible only because the object number ground truth verifies the absence of objects in these areas. If the entry and exit points of the AoI are not monitored by the sensor field, $S_{physical}$ can be evaluated as well, however this does not help the coverage completeness. The possibility of an object appearing sometime somewhere in a temporarily occluded domain cannot be excluded (e.g., a pedestrian may step from the sidewalk on the road). Therefore, even if it is known that a vehicle just travelled from a monitored area into a shadowed area, predicting the object or vehicle horizon does not provide any useful insight.

Figure 7:
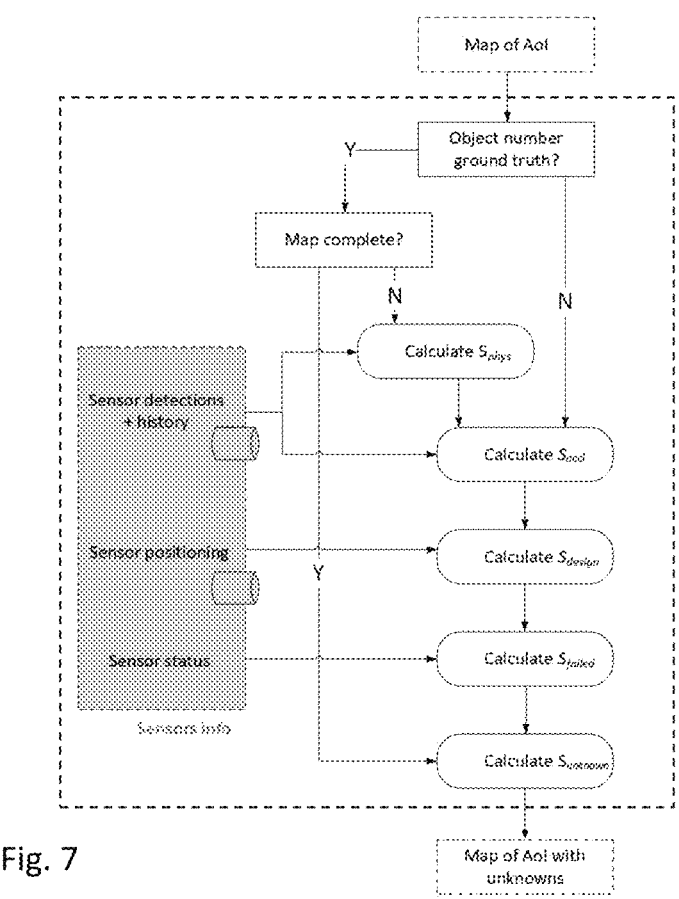
FIG. 7 shows an exemplary process flow in accordance with or implemented in exemplary embodiments of the present disclosure.

FIG. 7, shows, according to at least one exemplary embodiment of the present disclosure, the flow of FIG. 4 updated with the calculate unknown section updated as described herein.

Figure 8:
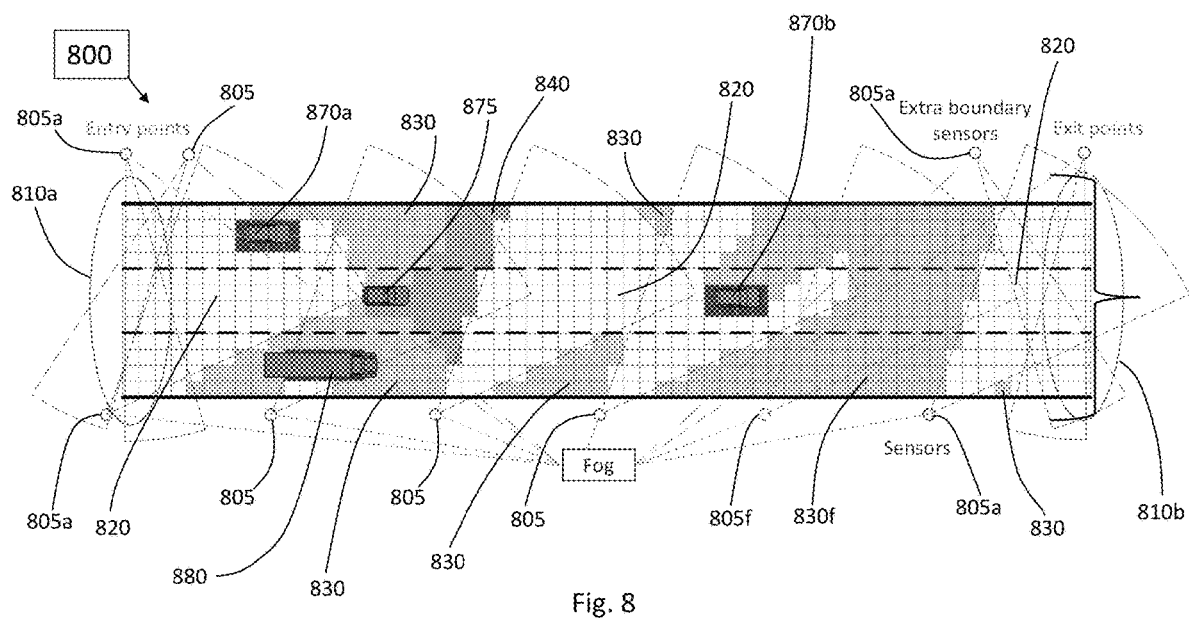
FIGS. 8 and 9 show exemplary roadside sensor structures in accordance with or implemented in exemplary embodiments of the present disclosure.

FIG. 8 shows, according to at least one exemplary embodiment of the present disclosure, an exemplary roadside sensor structure of a road segment 800. The fog may implement a method to dynamically improve map completeness in accordance with exemplary embodiments.

The roadside sensor structure may include a plurality of sensors 805 that are operatively communicative with the fog to monitor a road segment (AoI) 800 which currently includes cars 870a, 870b, 875, and truck 880. The field of views of the sensors may overlap so as to provide particular emphasis or redundant surveillance at predefined entry 810a and exit points 810b. Through detection of all incoming and outgoing objects, the sensor field can establish a notion of ground truth with respect to the number of vehicles in the AoI.

As shown in FIG. 8, one car 875 has just entered an occluded area behind a truck 880. The sensor field can be used to realize a temporary object incompleteness (e.g., the disappearance of the car 875). The fog, in response can, based on using and analyzing the most recent detection history, determine the domain of physically possible positions of the missing car. The intersection of this set of cells with all unknown cells defines the dynamic coverage incompleteness of the AoI, which represents a quality measure of the AoI map. The light cells 820 show cells that from coverage completeness analysis are determined be known, that is the occupancy statuses of these cells is originally known. Similarly, the darker cells 830 are cells that from coverage completeness analysis are determined to be unknown. For example, sensor 805*f* of the sensors 805 in FIG. 8 is a failed sensor, therefore the cells 830*f* are unknown due to this failed sensor 805*f*.

In FIG. 8, the dark cells 840 are originally part of unknown cells 830. In other words, the dark cells 840 are originally part of unknown cells 830 due to occlusion caused by the truck 880. In response to the fog realizing, through the sensor tracking of the car 875, that the car 875 has disappeared, the fog immediately accesses and uses past or historical sensor data in implementing a prediction scheme to estimate or determine the possible positions of the car 875. In this case, the dark cells 840 are the cells in which the cells determined from the prediction space intersect or overlap with the original unknown cells 830. Accordingly, the remaining cells that are outside or not part of 840 can all be identified and considered as having a known occupancy status e.g., unoccupied.

Figure 9:
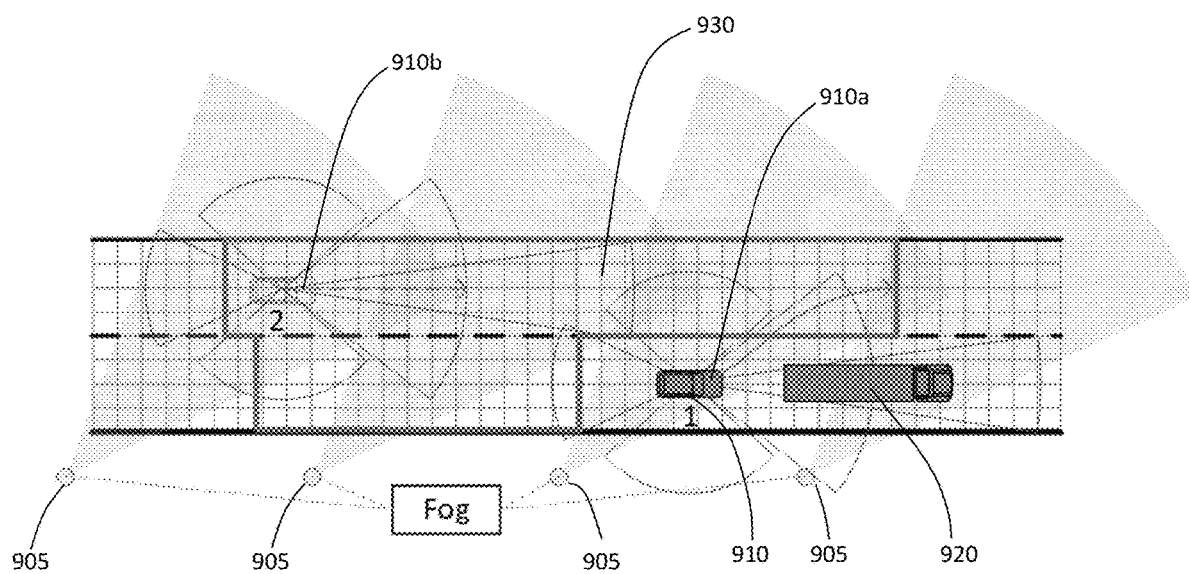

In exemplary embodiments, the generated map with updated completeness along with completeness metrics may be used by other agents (human or computer) in order to make decisions. For example, FIG. 9 shows, according to at least one exemplary embodiment of the present disclosure, an exemplary roadside sensor structure of a road segment 800. The fog may implement a method to dynamically improve map completeness in accordance with exemplary embodiments. Similar to the road segment of FIG. 8, the road segment of FIG. 9 may include roadside sensors 905 that are operatively in communication with the fog. In addition, the vehicles 910*a* and 920*b* also include sensors (not shown).

In this case, the road segment is a two-lane highway in which the car number 910*a* is blocked by a slow vehicle, truck 920, that it wishes to overtake. The AoI for car 910*a* to undertake such a maneuver extends far back because fast vehicles, such as vehicle 910*b* on the left lane, have to be anticipated in order to make a safe driving decision. However, the onboard sensing range of vehicle 910*a* in this case is not sufficient to cover this area. Therefore, the respective candidate map of the AoI for the vehicle 910*a* is highly incomplete (by design). However, the roadside infrastructure is capable of providing an almost complete dynamic map of the AoI, and thus verifies that overtaking is currently a safe option. In this example, both sources of information do not detect any immediate threats in the AoI while the onboard sensing field has no evidence at all. However, an agent, with both sources of information, e.g., dynamic maps with improved or updated completeness information, that is using the infrastructure sensor to actively verifies the absence of a safety risk can improve decisions. Thus a decision is therefore not based on collision avoidance, but on a completeness measure.

In various embodiments of the present disclosure, ground truth (e.g., the number of all possibly visible grid cells) is inferred given that the extent of the particular AoI is known, in contrast to the object number ground truth. Uncovered domains of the grid may only give a hint for possible object locations, but do not necessarily have to contain any missing objects, and thus the resulting completeness measure is overly conservative.

The exemplary embodiments of the present disclosure may be realized by computing device(s) performing the methods or similar methods described herein. For example, a computing device may include one or more processors configured to execute instructions (e.g., computer/hardware instructions) stored on and operatively accessible from suitable non-transitory computer readable media. Thus processor(s) of the terminal device can execute the instructions, which to cause the computing device to implement the methods or variations of the methods discussed herein.

While the above descriptions used various exemplary use cases, the use of these specific examples serve to enhance the clarity of the description and do not limit the applicability or scope of the techniques described herein. While the above descriptions and connected, figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

The following examples pertain to further aspects of this disclosure:

Example 1 is a method for execution by one or more computing devices including obtaining sensor data from a plurality of sensors over time, the plurality of sensors covering a sensor field; generating a map by fusing the obtained sensor data, wherein the generated map comprises a plurality of grid cells at least partially covered by the sensor field; determining, using the obtained sensor data, completeness of at least one portion of the generated map by determining object completeness and coverage completeness of the map from the obtained sensor data; and updating completeness of at least the portion of the generated map by reducing an amount of unknown areas of the at least one portion of the generated map using the determined object completeness and the determined coverage completeness.

In Example 2, the subject matter of Example 1, wherein determining object completeness may include: obtaining sensor data from ingress and egress sensors; determining, from data obtained from ingress and egress sensors, objects entering and leaving at least one portion of the generated map; determining, from the obtained sensor data, a current quantity of objects in the at least one portion of the generated map; and tracking, from the obtained sensor data, each of one or more objects in the at least one portion of the generated map.

In Example 3, the subject matter of Example 2, wherein determining object completeness may include determining disappearance of one or more objects from the at least portion of the generated map based on the tracking, the determined amount of objects and a net change of objects in the at least one portion of the generated map.

In Example 4, the subject matter of Example 3, wherein in response to determining one or more objects has disappeared from the at least one portion of the generated map, the method may further include determining a prediction space, wherein the prediction space comprises a set of grid cells for which the one or more determined disappeared objects can currently occupy.

In Example 5, the subject matter of Example 4, wherein determining the prediction space may further include: for each determined disappeared object, determining possible positions the disappearing object can currently occupy using past sensor data of each of the disappeared objects.

In Example 6, the subject matter of Example 5 wherein determining coverage completeness can include determining one or more unknown grid cells of the generated map, wherein the one or more unknown grid cells are grid cells for which there is insufficient sensor information.

In Example 7, the subject matter of Example 6, wherein updating completeness of at least the portion of the generated map can include eliminating unknown grid cells that are members of the determined prediction space.

In Example 8, the subject matter of Example 7, wherein eliminating unknown grid cells can include assigning a known status to the eliminated unknown grid cells.

In Example 9, the subject matter of any of Examples 6 to 8, wherein determining coverage completeness can further include determining one or more known grid cells of the generated map, wherein a grid cell is known in response to determining from the obtained sensor data that the grid cell is occupied or unoccupied by an object.

In Example 10, the subject matter of any of Examples 6 to 9, wherein one or more grid cells can be determined to be unknown in response to determining the one or more grid cells are not covered by the sensor field.

In Example 11, the subject matter of any of Examples 6 to 10, wherein one or more grid cells can be determined to be unknown in response to determining the one or more grid cells are not covered due to failure of one or more of the plurality of sensors.

In Example 12, the subject matter of any of Examples 6 to 11, wherein one or more grid cells can be determined to be unknown in response to determining the one or more grid cells are not covered due to occlusion.

In Example 13, the subject matter of any of Examples 2 to 12, wherein the object can be a vehicle.

In Example 14, the subject matter of any of Examples 1 to 13, wherein the method may further include obtaining an area of interest, wherein the at least one portion of the generated map is the obtained area of interest.

In Example 15, the subject matter of any of Examples 1 to 14, wherein the method may further include determining one or more completeness metrics of the at least one portion of the generated after improving the completeness.

In Example 16, the subject matter of any of Examples 2 to 15, wherein determining object completeness may include determining no objects are missing from the at least portion of the generated map based on the tracking, the determined amount of objects and a net change of objects in the at least one portion of the generated map.

In Example 17, the subject matter of Example 16, wherein in response to determining no objects are missing, the method may include determining all grid cells of the least one portion are known.

Example 18 is one or more computing devices including one or more processors and at least one non-transitory computer-readable storage medium that include instructions that, when executed by the one or more processors, cause the one or more processors to obtain sensor data from a plurality of sensors over time, the plurality of sensors covering a sensor field; generate a map by fusing the obtained sensor data, wherein the generated map comprises a plurality of grid cells at least partially covered by the sensor field; determine, using the obtained sensor data, completeness of at least one portion of the generated map by determining object completeness and coverage completeness of the map from the obtained sensor data; and update completeness of at least the portion of the generated map by reducing amount of unknown areas of the at least one portion of the generated map using the determined object completeness and the determined coverage completeness.

In Example 19, the subject matter of Example 18, wherein the executed instructions can cause the one or more processors to determine to object completeness by causing the one or more processors to: obtain sensor data from ingress and egress sensors; determine, from data obtained from ingress and egress sensors, objects entering and leaving at least one portion of the generated map; determine, from the obtained sensor data, a current quantity of objects in the at least one portion of the generated map; and track, from the obtained sensor data, each of one or more objects in the at least one portion of the generated map.

In Example 20, the subject matter of Example 19, wherein the executed instructions can cause the one or more processors to determine to object completeness by causing the one or more processors to determine disappearance of one or more objects from the at least portion of the generated map based on the tracked objects, the determined amount of objects, and a net change of objects in the at least one portion of the generated map.

In Example 21, the subject matter of Example 20, wherein in response to causing the or more processors to determine one or more objects has disappeared from the at least one portion of the generated map, the executed instructions can further cause the one or more processors to: determine a prediction space, wherein the prediction space comprises a set of grid cells for which the one or more determined disappeared objects can currently occupy.

In Example 22, the subject matter of Example 21, wherein the executed instructions can cause the one or more processors to determine the prediction space by further causing the one or more processors to: for each determined disappeared object, determine possible positions the disappearing object can currently occupy using past sensor data of each of the disappeared objects.

In Example 23, the subject matter of Example 22, wherein the executed instructions causing the one or more processors to determine coverage completeness can further include the executed instructions causing the one or more processors to: determine one or more unknown grid cells of the generated map, wherein the one or more unknown grid cells are grid cells for which there is insufficient sensor information.

In Example 24, the subject matter of Example 23, wherein the executed instructions causing the one or more processors to improve completeness of at least the portion of the generated map can further include the executed instructions causing the one or more processors to: eliminate unknown grid cells that are members of the determined prediction space.

In Example 25, the subject matter of Example 24, wherein the executed instructions causing the one or more processors to eliminate unknown grid cells can include the executed instructions causing the one or more processors to assign a known status to the eliminated unknown grid cells.

In Example 26, the subject matter of any of Examples 23 to 25, wherein the executed instructions causing the one or more processors to determine coverage completeness can further include the executed instructions causing the one or more processors to determine one or more known grid cells of the generated map comprises, wherein a grid cell is known in response to determining from the obtained sensor data that the grid cell is occupied or unoccupied by an object.

In Example 27, the subject matter of any of Examples 23 to 26, wherein one or more grid cells may be determined to be unknown in response to determining the one or more grid cells are not covered by the sensor field.

In Example 28, the subject matter of any of Examples 23 to 27, wherein one or more grid cells may be determined to be unknown in response to determining the one or more grid cells are not covered due to failure of one or more of the plurality of sensors.

In Example 29, the subject matter of any of Examples 23 to 28, wherein one or more grid cells may be determined to be unknown in response to determining the one or more grid cells are not covered due to occlusion.

In Example 30, the subject matter of any of Examples 19 to 29, wherein the object may be a vehicle.

In Example 31, the subject matter of any of Examples 18 to 30, wherein the executed instructions may further cause the one or more processors to obtain an area of interest, wherein the at least one portion of the generated map is the obtained area of interest.

In Example 32, the subject matter of any of Examples 18 to 31, wherein the executed instructions can further cause the one or more processors to determine one or more completeness metrics of the at least one portion of the generated after updating the completeness.

In Example 33, the subject matter of any of Examples 19 to 32, wherein the executed instructions causing the one or more processors to determine object completeness comprises can further include the executed instructions causing the one or more processors to determine no objects are missing from the at least portion of the generated map based on the tracked objects, the determined amount of objects, and a net change of objects in the at least one portion of the generated map In Example 34, the subject matter of Example 33, wherein in response to determining no objects are missing, the executed instructions may cause the one or more processors to determine all grid cells of the least one portion are known.

Example 35 is a system including one or more sensors; one or more computing devices, wherein the one or more computing devices are configured to: obtain sensor data from a plurality of sensors over time, the plurality of sensors covering a sensor field; generate a map by fusing the obtained sensor data, wherein the generated map comprises a plurality of grid cells at least partially covered by the sensor field; determine, using the obtained sensor data, completeness of at least one portion of the generated map by determining object completeness and coverage completeness of the map from the obtained sensor data; and update completeness of at least the portion of the generated map by reducing amount of unknown areas of the at least one portion of the generated map using the determined object completeness and the determined coverage completeness.

In Example 36, the subject matter of Example 35, which may further include one or more ingress and egress sensors, and wherein the one or more computing devices may be further configured to: obtain sensor data from ingress and egress sensors; determine, from data obtained from ingress and egress sensors, objects entering and leaving at least one portion of the generated map; determine, from the obtained sensor data, a current quantity of objects in the at least one portion of the generated map; and track, from the obtained sensor data, each of one or more objects in the at least one portion of the generated map.

In Example 37, the subject matter of Example 36, wherein the one or more computing devices may be further configured to determine to object completeness by determining disappearance of one or more objects from the at least portion of the generated map based on the tracked objects, the determined amount of objects, and a net change of objects in the at least one portion of the generated map.

In Example 38, the subject matter of Example 37, wherein in response to determining one or more objects have disappeared from the at least one portion of the generated map, the one or more computing devices may be further configured to determine a prediction space, wherein the prediction space comprises a set of grid cells for which the one or more determined disappeared objects can currently occupy.

In Example 39, the subject matter of Example 38, wherein the one or more computing devices configured to determine the prediction space can further include: for each determined disappeared object, the one or more computing devices being configured determining possible positions the disappearing object can currently occupy using past sensor data of each of the disappeared objects.

In Example 40, the subject matter of Example 39, wherein the one or more computing devices determining coverage completeness can include the one or more computing devices determining one or more unknown grid cells of the generated map, wherein the one or more unknown grid cells are grid cells for which there is insufficient sensor information.

In Example 41, the subject matter of Example 40, wherein the one or more computing devices configured to update completeness of at least the portion of the generated map can include the one or more computing devices being further configured to: eliminate unknown grid cells that are members of the determined prediction space.

In Example 42, the subject matter of Example 41, wherein one or more computing devices configured to eliminate unknown grid cells can include the one or computing devices being configured to reassign a known status to the eliminated unknown grid cells.

In Example 43, the subject matter of any of Examples 41 or 42, wherein the one or more computing devices configured to determine coverage completeness can further include the one or more computing devices being further configured to determine one or more known grid cells of the generated map, wherein a grid cell is known in response to determining from the obtained sensor data that the grid cell is occupied or unoccupied by an object.

In Example 44, the subject matter of any of Examples 41 to 43, wherein the one or more computing devices are configured to determine one or more grid cells as unknown in response to determining the one or more grid cells are not covered by the sensor field.

In Example 45, the subject matter of any of Examples 41 to 44, wherein the one or more computing devices are configured to determine one or more grid cells as unknown in response to determining the one or more grid cells are not covered due to failure of one or more of the plurality of sensors.

In Example 46, the subject matter of any of Examples 41 to 45, wherein the one or more computing devices are configured to determine one or more grid cells as unknown in response to determining the one or more grid cells are not covered due to occlusion.

In Example 47, the subject matter of any of Examples 36 to 46, wherein the object may be a vehicle.

In Example 48, the subject matter of any of Examples 35 to 47, wherein the one or more computing devices may be further configured to obtain an area of interest, wherein the at least one portion of the generated map is the obtained area of interest.

In Example 49, the subject matter of any of Examples 35 to 48, wherein the one or more computing devices may be further configured to determine one or more completeness metrics of the at least one portion of the generated after improving the completeness.

In Example 50, the subject matter of any of Examples 36 to 49, wherein the one or more computing devices configured to determine object completeness can include the one or more computing devices being further configured to determine that no objects are missing from the at least portion of the generated map based on the tracked objects, the determined amount of objects, and a net change of objects in the at least one portion of the generated map.

In Example 51, the subject matter of Example 50, wherein the one or more computing devices may be configured to, in response to determining no objects are missing, determine all grid cells of the least one portion are known.

It should be noted that one or more of the features of any of the examples above may be suitably combined with any one of the other examples.

The foregoing description has been given by way of example only and it will be appreciated by those skilled in the art that modifications may be made without departing from the broader spirit or scope of the invention as set forth in the claims. The specification and drawings are therefore to be regarded in an illustrative sense rather than a restrictive sense.

The scope of the disclosure is thus indicated by the appended claims and all changes which come within the meaning and range of equivalency of the claims are therefore intended to be embraced.

While the invention has been particularly shown, and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method for improving map completeness, comprising:
   obtaining sensor data from a plurality of sensors over time, the plurality of sensors covering a sensor field;
   generating a map by fusing the obtained sensor data, wherein the generated map comprises a plurality of grid cells at least partially covered by the sensor field;
   determining, using the obtained sensor data, completeness of at least one portion of the generated map by determining object completeness and coverage completeness of the map from the obtained sensor data; and
   updating completeness of at least the portion of the generated map by reducing an amount of unknown areas of the at least one portion of the generated map using the determined object completeness and the determined coverage completeness,
   wherein determining coverage completeness comprises
      determining one or more unknown grid cells of the generated map, wherein the one or more unknown grid cells are grid cells for which there is insufficient sensor information.

2. The method of claim 1, wherein determining object completeness comprises:
   obtaining sensor data from ingress and egress sensors;
   determining, from data obtained from ingress and egress sensors, objects entering and leaving at least one portion of the generated map;
   determining, from the obtained sensor data, a current quantity of objects in the at least one portion of the generated map; and
   tracking, from the obtained sensor data, each of one or more objects in the at least one portion of the generated map.

3. The method of claim 2, wherein determining object completeness comprises determining disappearance of one or more objects from the at least portion of the generated map based on the tracking, the determined amount of objects and a net change of objects in the at least one portion of the generated map.

4. The method of claim 3, wherein in response to determining one or more objects have disappeared from the at least one portion of the generated map, the method further comprises
   determining a prediction space, wherein the prediction space comprises a set of grid cells for which the one or more determined disappeared objects can currently occupy.

5. The method of claim 4, wherein determining the prediction space further comprises:
   for each determined disappeared object, determining possible positions the disappearing object can currently occupy using past sensor data of each of the disappeared objects.

6. The method of claim 5, wherein updating completeness of at least the portion of the generated map comprises:
   eliminating unknown grid cells that are members of the determined prediction space.

7. The method of claim 6, wherein eliminating unknown grid cells comprises assigning a known status to the eliminated unknown grid cells.

8. The method of claim 5, wherein determining coverage completeness further comprises determining one or more known grid cells of the generated map, wherein a grid cell is known in response to determining from the obtained sensor data that the grid cell is occupied or unoccupied by an object.

9. The method of claim 1, wherein one or more grid cells are determined to be unknown in response to determining the one or more grid cells are not covered by the sensor field.

10. The method of claim 1, wherein one or more grid cells are determined to be unknown in response to determining the one or more grid cells are not covered due to failure of one or more of the plurality of sensors.

11. The method of claim 1, wherein one or more grid cells are determined to be unknown in response to determining the one or more grid cells are not covered due to occlusion.

12. The method of claim 2, wherein the object is a vehicle.

13. The method of claim 1, further comprising obtaining an area of interest, wherein the at least one portion of the generated map is the obtained area of interest.

14. The method of claim 1, further comprising, determining one or more completeness metrics of the at least one portion of the generated after improving the completeness.

15. The method of claim 2, wherein determining object completeness comprises determining no objects are missing from the at least portion of the generated map based on the tracking, the determined amount of objects and a net change of objects in the at least one portion of the generated map.

16. The method of claim 15, wherein in response to determining no objects are missing, determining all grid cells of the least one portion are known.

17. One or more computing devices comprising one or more processors and at least one non-transitory computer-readable storage medium including instructions that, when executed by the one or more processors, cause the one or more processors to:
  obtain sensor data from a plurality of sensors over time, the plurality of sensors covering a sensor field;
  generate a map by fusing the obtained sensor data, wherein the generated map comprises a plurality of grid cells at least partially covered by the sensor field;
  determine, using the obtained sensor data, completeness of at least one portion of the generated map by determining object completeness and coverage completeness of the map from the obtained sensor data; and
  update completeness of at least the portion of the generated map by reducing an amount of unknown areas of the at least one portion of the generated map using the determined object completeness and the determined coverage completeness,
  wherein to determine coverage completeness comprises to
    determine one or more unknown grid cells of the generated map, wherein the one or more unknown grid cells are grid cells for which there is insufficient sensor information.

18. The one or more computing devices of claim 17, wherein the executed instructions cause the one or more processors to determine to object completeness by causing the one or more processors to:
  obtain sensor data from ingress and egress sensors;
  determine, from data obtained from ingress and egress sensors, objects entering and leaving at least one portion of the generated map;
  determine, from the obtained sensor data, a current quantity of objects in the at least one portion of the generated map; and
  track, from the obtained sensor data, each of one or more objects in the at least one portion of the generated map.

19. The one or more computing devices of claim 18, wherein the executed instructions cause the one or more processors to determine to object completeness by causing the one or more processors to determine disappearance of one or more objects from the at least portion of the generated map based on the tracked objects, the determined amount of objects, and a net change of objects in the at least one portion of the generated map.

* * * * *